US006975886B2

(12) United States Patent
Schönwald et al.

(10) Patent No.: US 6,975,886 B2
(45) Date of Patent: Dec. 13, 2005

(54) TELECOMMUNICATION TERMINAL AND A METHOD FOR COMMUNICATING WITH A SERVER BY MEANS OF A TELECOMMUNICATION TERMINAL

(75) Inventors: Jürgen Schönwald, Recklinghausen (DE); Stefan Hoyler, Bochum (DE)

(73) Assignee: Nokia Corporation, Espoo (FI)

( * ) Notice: Subject to any disclaimer, the term of this patent is extended or adjusted under 35 U.S.C. 154(b) by 198 days.

(21) Appl. No.: 10/362,411

(22) PCT Filed: Jul. 17, 2001

(86) PCT No.: PCT/EP01/08217

§ 371 (c)(1),
(2), (4) Date: Jun. 9, 2003

(87) PCT Pub. No.: WO02/17601

PCT Pub. Date: Feb. 28, 2002

(65) Prior Publication Data

US 2004/0102209 A1    May 27, 2004

(30) Foreign Application Priority Data

Aug. 25, 2000  (GB) .................................. 0021052

(51) Int. Cl.[7] .............................................. H04B 1/38
(52) U.S. Cl. .................... 455/564; 455/566; 455/550.1
(58) Field of Search ............................... 455/566, 564, 455/575.1, 550.1, 90.3

(56) References Cited

U.S. PATENT DOCUMENTS

| | | | | |
|---|---|---|---|---|
| 5,633,912 A | * | 5/1997 | Tsoi ............................ | 455/566 |
| 5,673,322 A | * | 9/1997 | Pepe et al. ..................... | 705/52 |
| 5,761,280 A | * | 6/1998 | Noonen et al. .......... | 379/93.27 |
| 5,809,415 A | * | 9/1998 | Rossmann ................ | 455/422.1 |
| 5,987,336 A | * | 11/1999 | Sudo et al. .................. | 455/566 |
| 6,144,863 A | * | 11/2000 | Charron ....................... | 455/566 |
| 6,463,304 B2 | * | 10/2002 | Smethers ..................... | 455/566 |
| 6,594,348 B1 | * | 7/2003 | Bjurstrom et al. ........ | 379/88.13 |
| 6,731,316 B2 | * | 5/2004 | Herigstad et al. ........... | 715/864 |
| 6,763,247 B1 | * | 7/2004 | Hollstrom et al. .......... | 455/352 |
| 6,771,981 B1 | * | 8/2004 | Zalewski et al. ........... | 455/557 |
| 6,799,061 B2 | * | 9/2004 | Jeoung ........................ | 455/566 |
| 2002/0049833 A1 | * | 4/2002 | Kikinis ....................... | 709/219 |

FOREIGN PATENT DOCUMENTS

CN           2338797 Y      1/1998

* cited by examiner

Primary Examiner—William Trost
Assistant Examiner—Sharad Rampuria
(74) Attorney, Agent, or Firm—Antonelli, Terry, Stout and Kraus, LLP.

(57) ABSTRACT

A telecommunication terminal (1,300) comprising a receiver and a transmitter (19) arranged to receive and transmit data, through a telecommunication network (310). The terminal further comprises a user interface (2–6) having display means (3,13) and a key-pad. The key-pad is provided with a group of keys arranged to type an alpha-numerical input to be displayed as an output on the display means. The display means is arranged to display different inputs and states depending on the input from the keypad. One pre-defined key in the group of keys is further arranged to a function for communicating with another terminal, at one state as is arranged to be displayed on said display means. This state will disable the alpha-numerical input of the pre-defined key and enables the function for communicating with another terminal, in order to facilitate browsing on the other terminal.

10 Claims, 4 Drawing Sheets

TELECOMMUNICATION TERMINAL AND A METHOD FOR COMMUNICATING WITH A SERVER BY MEANS OF A TELECOMMUNICATION TERMINAL

BACKGROUND OF THE INVENTION

1. Field of the Invention

The invention relates to a terminal and a method for communicating with a server terminal.

2. Description of the Prior Art

It becomes more and more common to use telecommunication terminals, like mobile phones, for accessing data through a server. Some of these terminals are provided with a browser, e.g. a WAP enabled browser, which enables access to an Internet network. The Wireless Application Protocol (WAP) Is a result of continuous work to define an industry wide standard for developing applications over wireless communication networks. WAP is disclosed in the WAP Forum Specifications made by different working groups within WAR Forum (see also http://www.wapforum.org/docs/technical.htm for technical documentation).

When using the browser it is by means of the so-called softkeys on the terminal, which controls the functions of the browser. The softkeys are defined to make a selection from different functions, like the phone book, phone settings, WAP browser, etc. However, when using the WAP browser it has been experienced as not sufficiently efficient, or rather to slow, when the user would like to access a WAP server. One reason could be that the user has to press the softkeys several times before accessing the browsing menu.

Therefore, there is a significant need for a telecommunication terminal to improve the efficiency, by speeding up the access to the browsing functions in the terminal.

U.S. Pat. No. 5,761,280 discloses a land-line telephone having web browser capabilities.

SUMMARY OF THE INVENTION

In accordance with an aspect of the present invention there is provided a communications terminal (1,300) comprising a receiver and a transmitter arranged respectively to receive and transmit data through a telecommunication network, a user interface having: a key-pad provided with a group of keys for allowing entry of alpha-numerical input for display, and display means arranged to display inputs and a state of the keypad depending on input from the keypad, at least one pre-defined key in said group of keys being further arranged to recall a function for communication with another terminal, in a non-alphanumerical stale which is arranged to be displayed on said display means, where in the non-alphanumerical state the alphanumerical input of the pre-defined key is disabled and said function for communication with another terminal is enabled, for facilitating browsing on the other terminal, characterised in that the function of the pre-defined key is user-definable and in that the communications terminal is a mobile telephone.

In accordance with a second aspect of the invention, there is provided a communications terminal comprising a receiver and a transmitter arranged respectively to receive and transmit data through a telecommunication network, a user interface having: a key-pad provided with a group of keys for allowing entry of alpha-numerical input for display, and display means arranged to display inputs depending on input from the keypad, at least one pre-defined key in said group of keys being further arranged to recall a function for communication with another terminal in a non-alphanumerical state in which the alpha-numerical input of the pre-defined key is disabled and said function for communication with another terminal is enabled, for facilitating browsing on the other terminal, characterised in that the function of the pre-defined key is user-definable and in that the communications terminal is a mobile telephone.

Hence, basically the invention provides a secondary state of the keypad, when using the browser on a terminal. When a connection to a server has been established to the terminal, the keypad enters the secondary state. The first state is preferably to enter a number, e.g. a telephone number, wherein the non-alphanumerical state is enabling a key to activate a particular function connected to that key. In turn, the function is connected to the browser, e.g. it can be a function like "HOME", "BACK" or "RELOAD". Also, it can be possible to adopt several keys on the keypad to different browsing functions.

In accordance with another aspect of the present invention there is provided a method of communicating with a terminal by means of a mobile telephone comprising a receiver and a transmitter, a user interface having display means and a keypad provided with a group of keys for enabling entry of an alpha-numerical input for display on the display means, wherein the method comprises the following steps: sending a request to said terminal for establishing a connection through said transmitter, receiving a response from said terminal confirming the connection to said terminal by means of said receiver, disabling the alpha-numerical input of a pre-defined key in said group of keys on said keypad, enabling a functionality of the pre-defined key for communicating with said terminal upon an input from the pre-defined key, and allowing the function of the pre-defined key to be user definable.

A particular advantageous embodiment, is that the terminal can also comprise an indication of the function on the pre-defined key, which indicates the function of the key in a state.

Further advantages according to the present invention will be apparent from the dependent claims.

BRIEF DESCRIPTION OF THE DRAWINGS

The invention will be described in greater detail in the following by way of example only and with reference to the attached drawings, in which FIG. 1 schematically illustrates a preferred embodiment of a hand portable phone according to the present invention, FIG. 2 schematically shows the essential parts of a telephone for communicating with a cellular or cordless network.

DETAILED DESCRIPTION OF THE INVENTION

Figure 1:
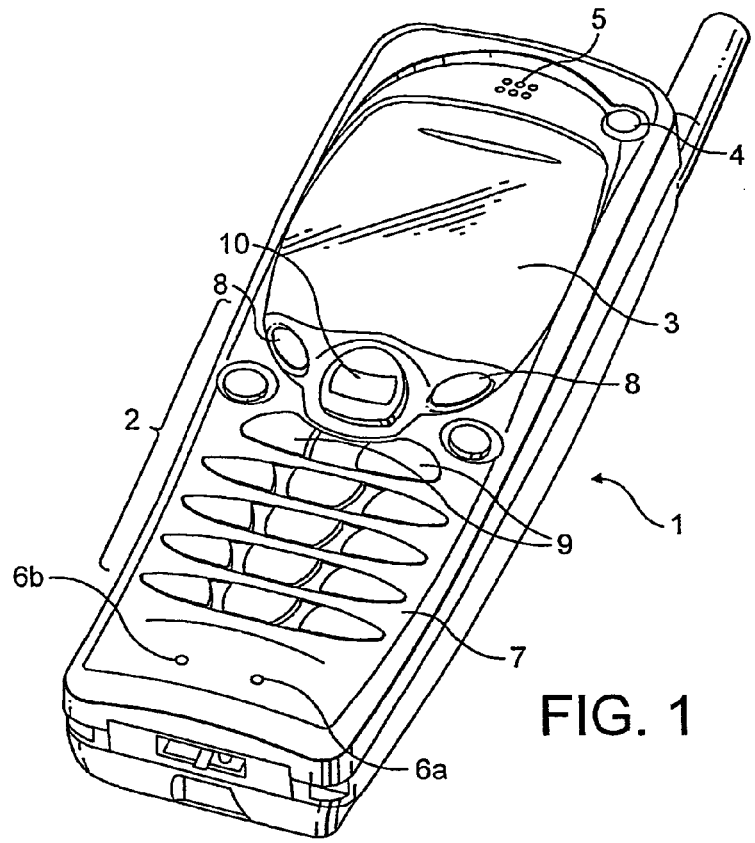

FIG. 1 shows a preferred embodiment of a wireless communication terminal, hereafter also referred to as a phone, according to the present invention. The phone, which is generally designated by 1, comprises a user interface having a keypad 2, a display 3, an on/off button 4, a speaker 5, and a microphone 6. The phone 1 according to the preferred embodiment is adapted for communication via a wireless telecommunication network, e.g. a wireless network. However, the phone could also have been designed for a cordless network. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a FIG. "0.9" or a sign "#" or "*", respectively. In alpha mode each key is associated with a number of letters and special signs used in text editing. The keypad 2 additionally comprise two soft keys 8, two call handling keys 9, and a navigation key 10.

The two soft keys 8 have a functionality corresponding to what is known from the phones Nokia 2110™, Nokia 8110™ and Nokia 3810™. The functionality of the soft key depends on the state of the phone and the navigation in the menu by using a navigation key. The present functionality of the soft keys 8 is shown in separate fields in the display 3 just above the keys 8.

The two call handling keys 9 are used for establishing a call or a conference call, terminating a call or rejecting an incoming call.

The navigation key 10 is an up/down key and is placed centrally on the front surface of the phone between the display 3 and the group of alphanumeric keys 7. Hereby the user will be able to control this key by simply pressing the up/down key using his/her thumb, i.e. it allows the user to scroll between a group of items in e.g. a menu provided in the user interface. Since many experienced phone users are used to one-hand control, it is a very good solution to place an input key, requiring precise motor movements. Thus, the user may place the phone in the hand between the finger tips and the palm of the hand. Hereby, the thumb is free for inputting information. In another embodiment, the scroll key can be a roller key (not shown), which is arranged to rotate in one or several directions. The roller allows the user to roll the key to scroll between different items in a menu. In case of a roller key, the soft key 8 could be arranged to the roller, i.e. upon pressing on the roller the same functionality, as the operation key has, could be entered. The roller key has a functionality corresponding to what is known from. e.g. the phone Nokia 7110™, which also supports the Wireless Application Protocol (WAP). The roller key is described in U.S. patent application Ser. No. 08/923,696, the disclosure of which is incorporated herein by reference.

Figure 2:
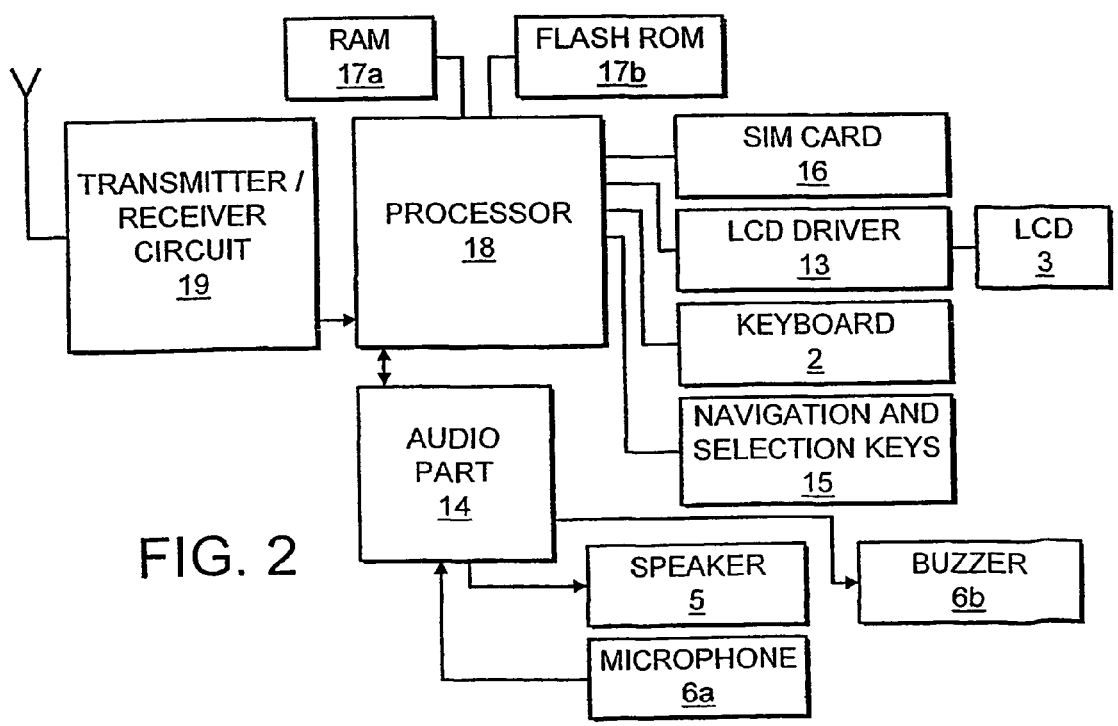

FIG. 2 schematically shows the most essential parts of a preferred embodiment of the phone. These parts being essential to understand the invention. The preferred embodiment of the phone of the invention is adapted for use in connection with a GSM network, but, of course, the invention may also be applied in connection with other phone networks, such as other kinds of wireless networks and various forms of cordless phone systems or in dual band phones accessing sets of these systems/networks. The microphone 6 records the user's speech, and the analogue signals formed thereby are A/D converted in an A/D converter (not shown) before the speech is encoded in an audio part 14. The encoded speech signal is transferred to control means 18. The control means 18 comprises a processor, which may support software in the phone. The control means 18 also forms the interface to the peripheral units of the apparatus, wherein the peripheral units can comprise a RAM memory 17a and a Flash ROM memory 17b, a SIM card 16, the display 3, a browser application 20, and the keypad 2 (as well as data, power supply, etc.). The browser application can be used to request and receive content from a server, which is described in more detail hereinafter, with reference to FIGS. 3–5. The control means 18 communicates with a transmitter/receiver means 19, e.g. a circuit which is adapted to send/receive a request/respond to/from a telecommunication network. The audio part 14 speech-decodes the signal, which is transferred from the control means 18 to the earpiece 5 via a D/A converter (not shown).

The control means 18 is connected to the user interface. Thus, it is the control means 18 which monitors the activity in the phone and controls the display 3 in response thereto. Therefore, it is the control means 18 which detects the occurrence of a state change event and changes the state of the phone and thus the display text. A state change event may be caused by the user when the user activates the keypad including the navigation key 10, and these type of events are called entry events or user events. However, the network 7110™, which also supports the Wireless Application Protocol (WAP). The roller key is incorporated by reference in U.S. patent application Ser. No. 09/923,696.

Figure 3:
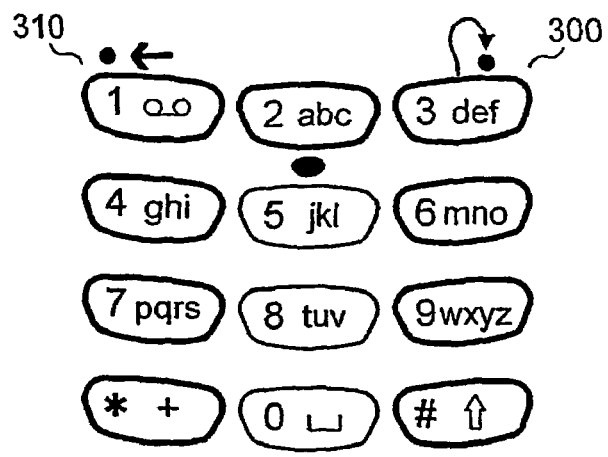
FIG. 3 shows an example of the keypad of the user interface, according to a preferred embodiment according to the present invention.

FIG. 3 shows an example of a keypad 300 of the user interface as shown in FIG. 1. The keypad is corresponding to the first group of keys as shown in FIG. 1, i.e. the alphanumeric keys. The display means as shown in FIG. 1 is arranged to display different inputs and states depending on the input from the keypad.

In accordance with the present invention, at least one pre-defined key 310 in the first group of keys is arranged to enable a function for communicating with a server or another communication terminal upon an input from the key in the group of keys 300, at a first state, which disables the alpha-numerical input of the pre-defined key 310 and enables a secondary functionality of the first group of keys 300. In this particular embodiment it is shown four pre-defined keys marked with 1, 2, 3, and 5, which have the following secondary functions as is indicated above the keypads numbers: 1=Back, 2=Home, 3=Reload, 5=Stop. The pre-defined keys are marked with indicators, which are symbols indicating the different functions of the keys in a particular state. Also, it is possible to replace the indicators, by an exchangeable cover, the keypad and/or by placing a cover over the present keypad. By using an replaceable cover, it could be convenient to enable the pre-defined key to be user defined, i.e. enabling a user to define a function which is re-called upon an input from the key. Then the user could attach a suitable symbol or text to the key, e.g. by means of gluing or printing. The definition of the functions could be done in one of the menus in provided in the phone. In this way, the keys will facilitate browsing on the server or the other terminal. An example of how these keys will affect the display is shown with reference to FIG. 5.

In a preferred embodiment the secondary functionality is a browser application, comprising sub-functions arranged to communicate with a server. Examples of sub-functions could be as said above, i.e. back, home, reload, and stop. Also, it could be possible to associate a so called bookmark to a key. A bookmark is a shortcut to an hypermedia link, e.g. like Universal Resource Locators (URL) which are used to identify and control access to resources on the network.

Since the present invention reflects a telecommunication terminal, it is appropriate to have a browser application which is arranged to use the Wireless Application Protocol (WAP).

Figure 4:
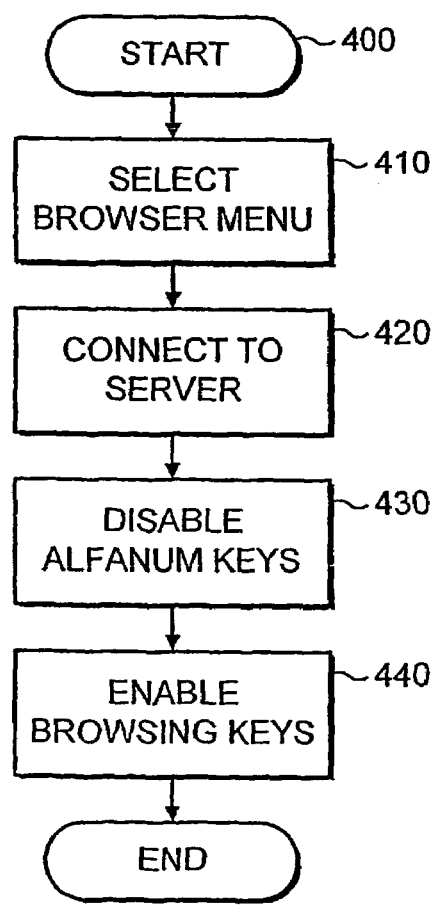
FIG. 4 shows a flowchart over a method for communication between a server and a telecommunication terminal, according to the present invention.

FIG. 4 shows a flow chart, describing a method in accordance with the present invention, describing a way of communicating with a server from a wireless communication terminal. The wireless telecommunication terminal in this example is the same type as described in FIGS. 1 and 2, and the apparatus is hereafter also referred to as a phone. The phone is provided with a browser application and a memory which enables the user to browse among different objects on a server. This browsing can be done by using a browser application supporting WAP. When the phone is activated and establishes, a wireless connection to a wireless network, e.g. when the phone roams to a new network, "START" 400, it is possible to communicate with different telecommunication services, e.g. WAP related services, i.e. a service which can be accessed from a server to the phone. By using this kind of service, it might be possible to obtain information from a server to the phone, e.g. by using SMS (Short Message Service), or a similar service.

First, the user may select a browser menu 410 on a display controlled by the browser application, which is connected to the memory. In this browser menu the user can choose to establish a session to a server, in order to access content from the server. In this embodiment, the content can be a deck, comprising cards provided in a language supporting WAP, like WML, WMLscript, or XML. It is also possible to have it in another format, and format the content into a suitable format at the linking means. To establish the session the user selects the service connected to the server from the menu. The selection is done by e.g. pressing on one of the softkeys as shown in FIG. 1.

Secondly, a request is sent to a server for establishing a connection 420 through the transmitter of the phone. Thereafter, the phone receives a response from the server confirming the connection to the server through the receiver.

Thirdly, the alpha-numerical input on the keypad will be disabled 430. It is not necessary that the whole keypad is disabled, i.e. it could be one or more pre-defined keys on the keypad which is disabled. Finally, the disabling of the alpha-numerical input will in turn enable a secondary functionality of the first group of keys 440, and enabling the secondary functionality of the keys in the group of keys for communicating with a server upon an input from the key in the group of keys. Thus, as shown in FIG. 3, the keys 1, 2, 3 and 5 may be disabled, and the secondary functionality of BACK, HOME, RE-LOAD and STOP will be enabled.

Figure 5A:
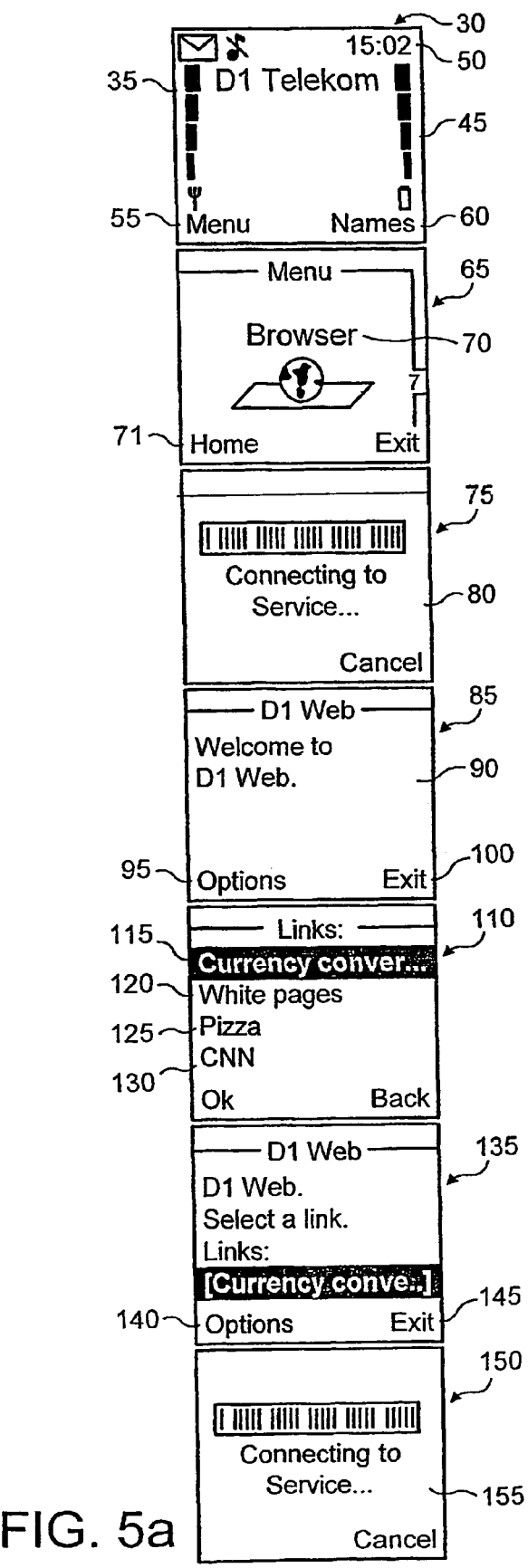
FIGS. 5*a*–*b* shows an example of a user interface in a phone according to the present invention.
Figure 5B:
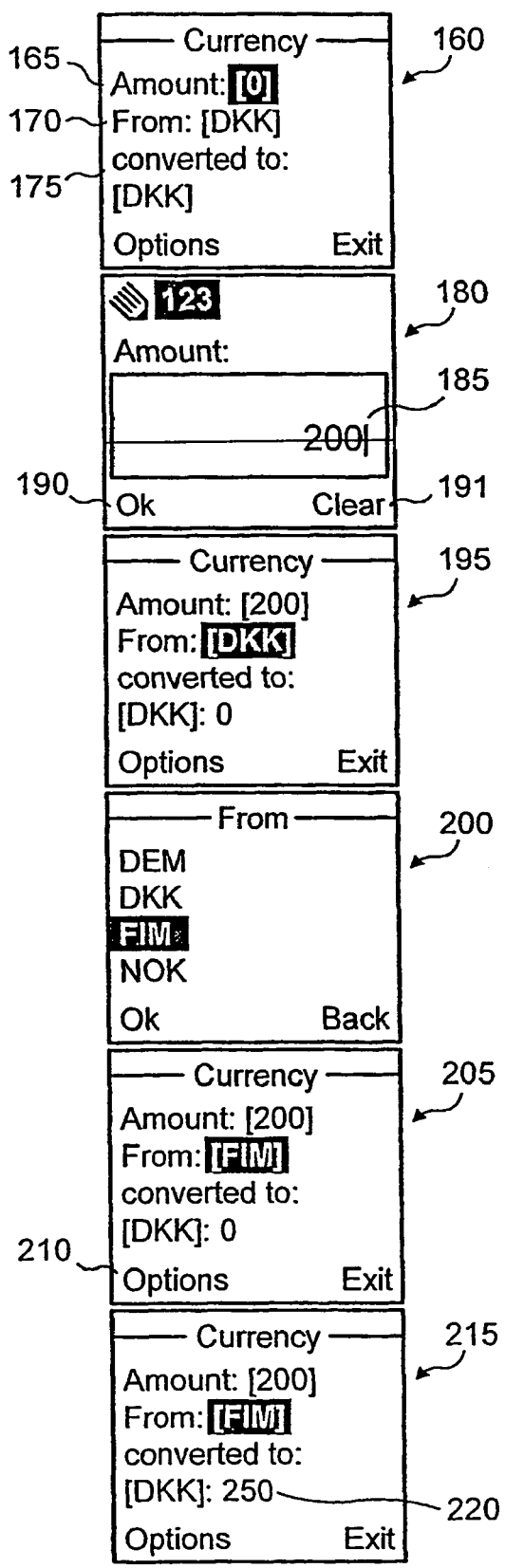

With reference to FIGS. 5a and 5b an example is shown on how the display in a user interface can act by Interaction of the user according to the present invention. The user interface may comprise the same elements as shown in FIG. 1, i.e. a keypad 2, a display 3, an on/off button 4, a speaker 5 and a microphone 6. Also, it is the control means 18 In FIG. 2 which controls the user interface. Starting from FIG. 5a, there is a layout 30 presented on a display in a phone, as shown in FIGS. 1 and 2, which indicates signal strength 35 from the wireless telecommunication network "D1 Telekom", the battery power 45 and a clock showing the time 50 in hours and minutes. Preferably, the display in the phone is an LCD (Liquid Crystal Display) display. The display, can be controlled by the control means 18 as shown in FIG. 2. The layout 30 presents an example of the phone in idle mode, i.e. when the phone is activated and awaiting an action, e.g. an incoming or outgoing call.

In the bottom of the display there are two items which are denoted as "Menu" 55 and "Names" 60. If the user selects "Names" 60 he/she can e.g. access a built in phone book. If the user selects "Menu" 55, he/she can select among several different menus. The actual selection of features in the bottom of the display, like "Menu" and "Names", can be selected by means of the soft keys disclosed with reference to FIG. 1.

One of the menus can be the next layout 65 called "Browser" 70. If the user chooses to use this menu, he/she can access different telecom related information services, e.g. Internet. One way of accessing this kind of information is to use the Wireless Application Protocol, WAP. The Wireless Application Protocol (WAP) is a result of continuous work to define an industry wide standard for developing applications over wireless communication networks. WAP is disclosed in the WAP Forum Specifications made by different working groups within WAP Forum (see also http://www.wapforum.org/docs/technical.htm for technical documentation)

If the user chooses to select "Home" 71, this may lead to the next layout 75, which graphically indicates, "Connecting to Service" 80. This shows an example of how the phone is trying to establish a connection to e.g. Internet, by sending an access request to a server. If a connection is established, some kind of welcome text for a home page might be displayed, "Welcome to D1 Web." 90. The alpha-numerical input on the keypad is now disabled, and the browsing is now handled by the softkeys as shown in FIG. 1. As said above with reference to FIG. 4, it is not necessary that the whole keypad is disabled, i.e. it could be one or more pre-defined keys on the keypad which is disabled. In accordance with the present invention, the disabling of the alpha-numerical input will in turn enable the secondary functionality of the first group of keys, and thereby enabling the secondary functionality of the keys in the group of keys for communicating with a server upon an input from the key in the group of keys.

If the user selects "Options" 95 a list of selections can be displayed as shown in the following layout 110. For example, the different choices could be "Currency converter" 115, "White pages" 120, "Pizza" 125, "CNN" 130, etc. In this example the user selects to use the currency converter 115, and browses further to this application in the next layout 135. In this layout 135 a browser display is shown with the selected item, which is indicated as a link to a service which provides a currency conversion. The user can select to send a request for the chosen item, by using the "Options" 140.

This leads to the next layout 150, as shown in layout 75, which graphically indicates, "Connecting to Service" 155. This shows an example of how the phone is trying to establish a connection to e.g. the application (currency converter 115), by sending a request to the server. If a connection is established, some kind of Information text for the currency converter might be displayed. The following reference numbers refers to FIG. 5b: 160–230. For example, the layout can be provided with different editable fields and selection list placeholders, which in this example are shown in square brackets ([ ]). The selection which is highlighted can indicate a default state of the selection. In these fields, the user can input an amount, "Amount:[ ]" 165, in one currency, "From:[DKK]" 170, converted into another currency, "converted to:[DKK] 175. When the user is going to enter an amount 185, e.g. 200, on how much he/she would like to convert, the layout may e.g. change its outlook like it does in layout 180. Thus, upon entering editable fields, the primary functionality of the keypad is enabled, and the secondary functionality is disabled. Thereafter, the user may press Ok 190, whenever he/she is done, or clear the amount by selecting "Clear" 191. After this step, the primary functionality of the keypad is being disabled again, and the secondary functionality is enabled instead.

The steps for choosing a first currency to convert from 170, and choosing a second currency to convert to 175, are repeated in the layouts 195–205. Thereafter, the user may select "Options" 210, in layout 205, which in this example activates the calculation of the currency conversion and displays the result 220 in the next layout 215. Alternatively, the user could use the "RELOAD" key as shown in FIG. 3, i.e. the "3" key, which could be dedicated with this secondary function. Since, the user has completed all the necessary parameters into the currency converter, the server is able to calculate the result upon re-loading the page.

If the user now would like to order a pizza instead of doing currency converting, it could be possible to use the "BACK" key, i.e. "1" key as shown in FIG. 3. Then the user should be directed back to the Link page, as shown in layout 135, and then choose the Pizza link 125 as shown in layout 110. Alternatively, the user could return to the homepage, i.e. in this case the first page as was shown in layout 85, it is possible to simply press on the "HOME-KEY", i.e. the "2" key on the keypad as shown in FIG. 3. Then, the user is back is from the start.

The invention is not limited to the above described and in the drawing shown an example of embodiments but can be varied within the scope of the appended claims. For example, it could be possible to enable the secondary functionality of the first group of keys could be enabled by pressing on a key for a longer time period, which also disables the alpha-numerical input and enters the browser. Thus, the key could then individually be operable in first and second time periods to provide a function for communicating with a server or another communication terminal, in form of a shortcut. This can be the case if the user would like to directly connect his homepage, without entering the browsing menu in the phone. Also, this enables the user to connect his bookmarks to the keys, as else normally is accessed under the browsing menu.

What is claimed is:

1. A mobile telephone comprising:
   a receiver and a transmitter arranged respectively to receive and to transmit data through a telecommunication network; and
   a user interface including a keypad provided with a group of keys, said group of keys being switchable depending on an input from said keypad between a first state and a second state, each of said group of keys being operable in said first state for allowing entry of alpha-numerical input for display, and a display arranged to display inputs; and wherein
   said mobile telephone is arranged when said group of keys is in the second state to disable said alpha-numerical input of at least one pre-defined key in said group of keys, and to enable said at least one pre-defined key to call a sub-function of a browser application for communication with a server, for facilitating browsing on the server, wherein said sub-function of said at least one pre-defined key when said group of keys is in said second state is user-definable.

2. The mobile telephone of claim 1, wherein said display is arranged to display which of said first state and said second state the group of keys is presently in.

3. A mobile telephone according to claim 1, wherein said browser application is arranged to use the Wireless Application Protocol.

4. A mobile telephone according to claim 1, wherein the pre-defined key is marked with an indicator, indicating the function of the key in the non-alphanumerical state.

5. A mobile telephone according to claim 4, in which said indicator is replaceable, by means of at least one of a cover and a keypad comprising said indication.

6. A mobile telephone according to claim 1, wherein the at least one pre-defined key is arranged to enable further functions, which are enabled in a state other than the non-alphanumerical state.

7. A mobile telephone according to claim 1, wherein the at least one pre-defined key may be defined by a user to be associated with a bookmark.

8. A mobile telephone according to claim 1, wherein said at least one pre-defined key is individually operable in first and second time periods to provide a function for communicating with another terminal.

9. A method of communicating with a server by means of a mobile telephone in a system including a receiver and a transmitter, and
   a user interface including a keypad provided with a group of keys, said group of keys being switchable between a first state and a second state, each of said group of keys being operable in said first state for enabling entry of an alpha-numerical input, and a display arranged to display inputs, and wherein
   the method comprises the steps of sending a request to said server through said transmitter for establishing a connection with said server, receiving a response by means of said receiver from said server confirming the connection to said server, and when the group of keys is in the second state disabling said alpha-numerical input of at least one pre-defined key in said group of keys on said keypad, enabling said at least one pre-defined key to call a sub-function of a browser application for communicating with said server upon an input from said at least one pre-defined key, and allowing said sub-function of said at least one pre-defined key when said group of keys is in said second state to be user-definable.

10. The mobile telephone of claim 1, wherein said sub-function of said browser application comprises one sub-function from the group 'Back', 'Home', 'Reload' and 'Stop'.

* * * * *